(12) United States Patent
Shi

(10) Patent No.: US 10,459,168 B2
(45) Date of Patent: *Oct. 29, 2019

(54) OPTICAL DEVICES AND METHOD FOR TUNING AN OPTICAL SIGNAL

(71) Applicant: UNIVERSITÉ LAVAL, Québec (CA)

(72) Inventor: Wei Shi, Quebec (CA)

(73) Assignee: UNIVERSITE LAVAL, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,590

(22) Filed: Aug. 28, 2018

(65) Prior Publication Data

US 2019/0079246 A1 Mar. 14, 2019

Related U.S. Application Data

(63) Continuation of application No. 15/559,603, filed as application No. PCT/CA2016/050301 on Mar. 17, 2016, now Pat. No. 10,088,630.

(60) Provisional application No. 62/135,960, filed on Mar. 20, 2015.

(51) Int. Cl.
| | | |
|---|---|---|
| *G02B 6/293* | (2006.01) | |
| *G02B 6/12* | (2006.01) | |
| *G02B 6/124* | (2006.01) | |
| *H04J 14/02* | (2006.01) | |
| *G02B 6/136* | (2006.01) | |

(52) U.S. Cl.
CPC ......... *G02B 6/29328* (2013.01); *G02B 6/124* (2013.01); *G02B 6/12007* (2013.01); *G02B 6/29382* (2013.01); *G02B 6/29395* (2013.01); *G02B 6/136* (2013.01); *H04J 14/02* (2013.01)

(58) Field of Classification Search
None
See application file for complete search history.

(56) References Cited

U.S. PATENT DOCUMENTS

| | | |
|---|---|---|
| 5,457,758 A | 10/1995 | Snitzer |
| 6,404,946 B1 | 6/2002 | Nakajima et al. |
| 6,526,199 B1 | 2/2003 | Song et al. |
| 6,878,926 B2 | 4/2005 | Martinez et al. |
| 7,373,045 B2 | 5/2008 | Levner et al. |

(Continued)

FOREIGN PATENT DOCUMENTS

CN 102412504 A 11/2011

OTHER PUBLICATIONS

Zhang et al. "Experimental Demonstration of Dynamic Bandwidth Allocation Using a MEMS-Actuated Bandwidth-Tunable Microdisk Resonator Filter", IEEE Photonics Technology Letters, vol. 19, No. 19, Oct. 1, 2007, pp. 1508-1510, Canada.

(Continued)

*Primary Examiner* — Sung H Pak
(74) *Attorney, Agent, or Firm* — Norton Rose Fulbright Canada LLP; Reno Lessard

(57) ABSTRACT

The optical device coupleable to a waveguide to receive an optical signal from the waveguide generally has at least two optical grating devices optically coupled to one another and having corresponding spectral responses, the spectral response of at least one of said optical grating devices being tunable to adjust an amount of overlapping between the spectral responses of the at least two optical grating devices.

20 Claims, 13 Drawing Sheets

(56) References Cited

U.S. PATENT DOCUMENTS 8,340,484 B2 12/2012 Vasilyev et al.
10,088,630 B2 * 10/2018 Shi .................. G02B 6/12007

OTHER PUBLICATIONS

St-Yves et al., "Widely bandwidth-tunable silicon filter with an unlimited free-spectral range", Optics Letters, vol. 40, No. 23, Dec. 1, 2015, pp. 5471-5474, Canada.
Ong et al, "Ultra-High-Contrast and Tunable-Bandwidth Filter Using Cascaded High-Order Silicon Microring Filters" IEEE Photonics Technology Letters, vol. 25, No. 16, Aug. 15, 2013, pp. 1543-1546, Canada.
Jinno et al., "Spectrum-Efficient and Scalable Elastic Optical Path Network: Architecture, Benefits, and Enabling Technologies", Topic in Optical Communications, IEEE Communications Magazine, Nov. 2009, pp. 66-73, Canada.
Gerstel et al., "Elastic Optical Networking: A New Dawn for the Optical Layer?", Beyond 100G Optical Communications, IEEE Communications Magazine, Feb. 2012, pp. S12-S20, United States.
Shi et al., "Silicon photonic grating-assisted, contra-directional couplers", Optics Express, vol. 21, No. 3, Feb. 11, 2013, pp. 3633-3650, United States.
Wilson et al., "Spectral Passband Filter With Independently Variable Center Wavelength and Bandwidth", IEEE Photonics Technology Letters. vol. 18. No. 15. Aug. 1, 2006, pp. 1660-1662, United States.
Shi et al., "Silicon CWDM Demultiplexers Using Contra-Directional Couplers", IEEE, Conference on Lasers and Electro-Optics (CLEO), Jun. 2013, United States.

* cited by examiner

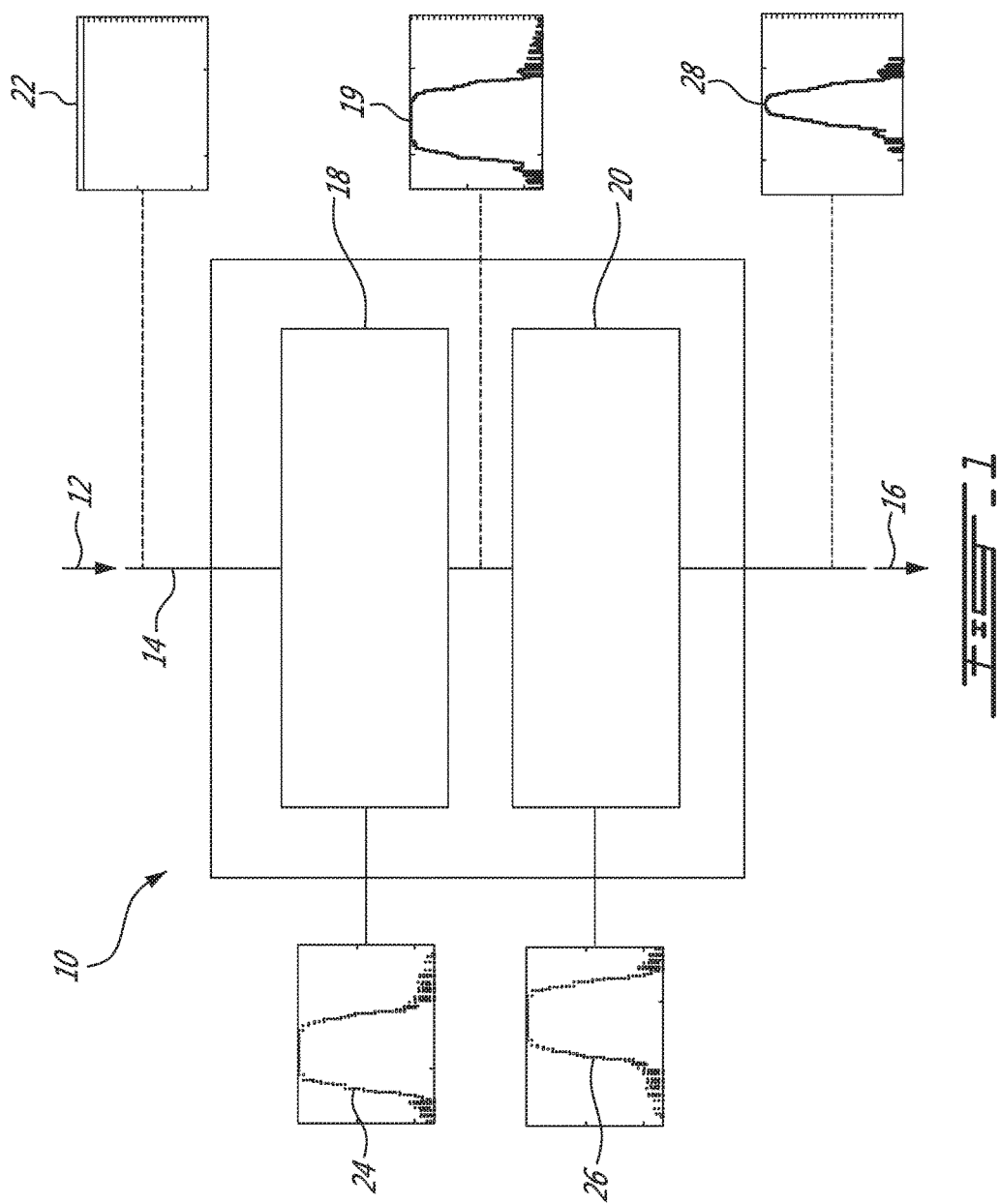

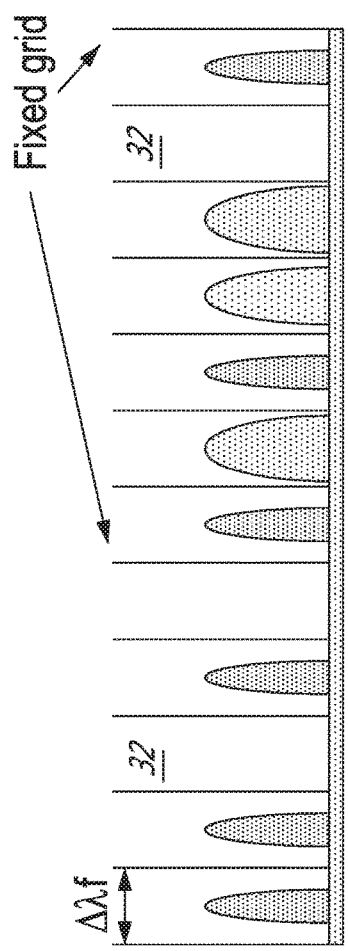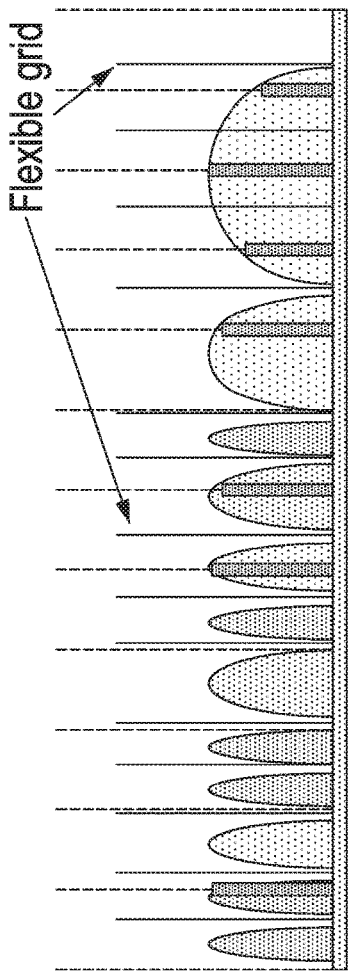

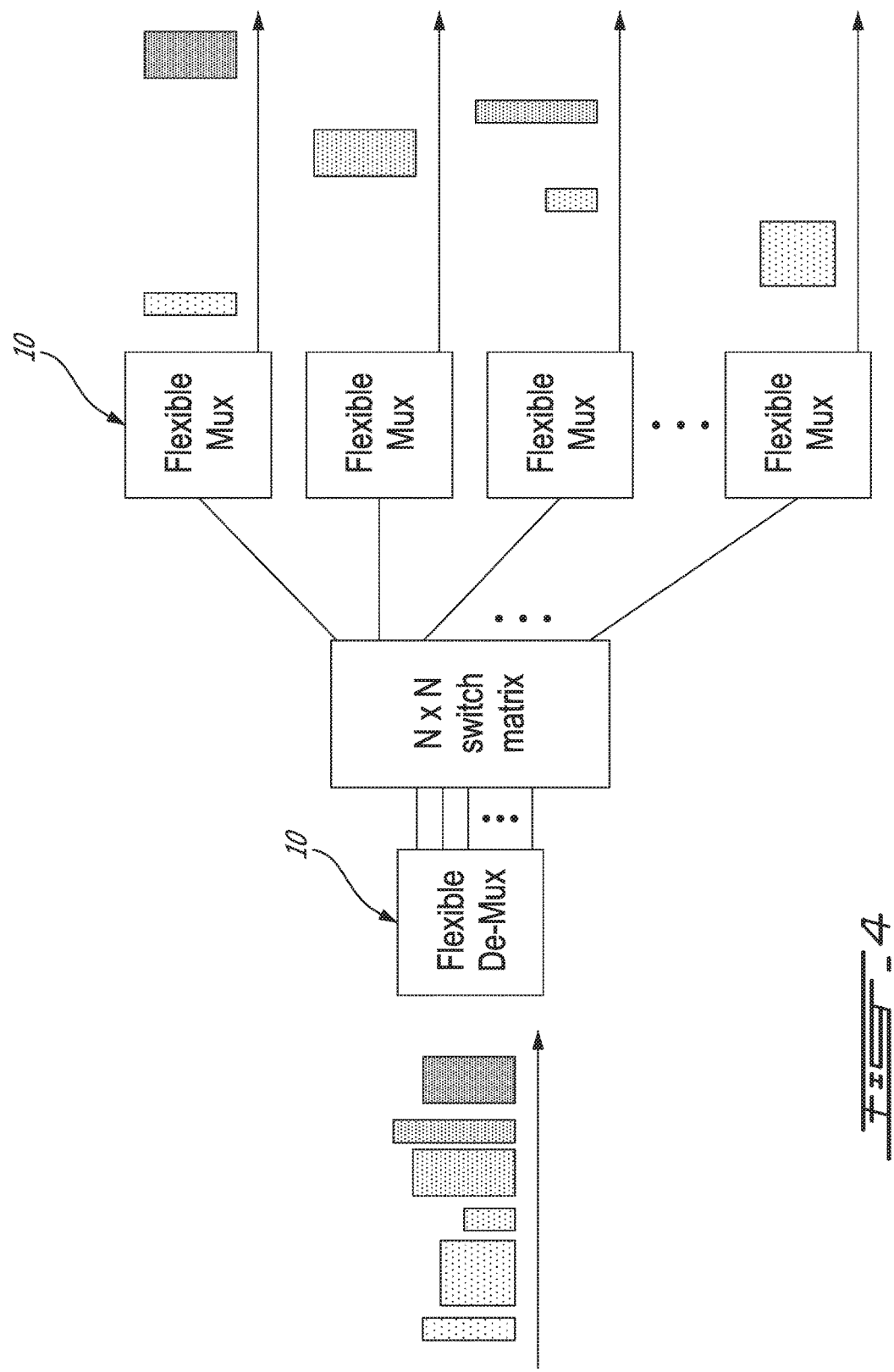

OPTICAL DEVICES AND METHOD FOR TUNING AN OPTICAL SIGNAL

FIELD

The present invention relates to the field of wavelength-division multiplexing optical communications, and, in particular embodiments, to an apparatus and method for tunable optical filtering and switching functions.

BACKGROUND

Optical filters are key components for optical communication applications such as wavelength-division multiplexing (WDM), signal processing, and dynamic bandwidth allocation. These key devices are now desirable in integrated photonic systems, especially on silicon-on-insulator (SOI) wafers, to achieve the same functions as traditional discrete optical components such as diffractive grating spectrometers. Silicon photonics allows for complementary metal-oxide-semiconductor (CMOS) compatible mass fabrication for low cost, high yield, and large-scale on-chip integration.

Future high-capacity transmission systems, e.g., applying the super-channel technique, will require a dynamic channel bandwidth allocation over a few hundred gigahertzes. However, large bandwidth tunability is currently only available in bulky bench-top systems. Existing integrated tunable filters, e.g., using microring resonators and Mach-Zehnder interferometers (MZIs), have relatively small tunable bandwidth (less than 200 GHz). Also, their free spectral ranges (FSRs) are small, typically less than 10 nm. There always remains room for improvement.

SUMMARY

Bragg gratings are a class of wavelength-selective optical grating devices with periodic dielectric perturbations in optical waveguide structures. They are also referred to as one dimensional photonic crystals. Their bandwidth can be easily tailored in a wide wavelength range. Various Bragg grating devices have been proposed and implemented in optical fibers as well as in planar waveguides, including reflective Bragg gratings in single waveguides and grating-assisted coupler structures with add-drop operation. In particular, compact grating-assisted, contra-directional couplers (contra-DCs) have been developed for a variety of functions such as add-drop filters, switches, and tunable delay lines. Cascade structures using these Bragg grating devices with fixed bandwidths are also possible. Moreover, integrated Bragg grating devices, such as band-pass optical filters and wavelength multiplexers/demultiplexers, have been provided on SOI wafers for WDM optical communication networks.

However, these devices, taken individually, have fixed optical bandwidth and, therefore, cannot be used for future flexible WDM optical networking.

In accordance with one aspect, there is provided an optical device coupleable to a waveguide to receive an optical signal from the waveguide, the optical device comprising at least two optical grating devices optically coupled to one another and having corresponding spectral responses, the spectral response of at least one of said optical grating devices being tunable to adjust (e.g., vary, maintain) an amount of overlapping between the spectral responses of the at least two optical grating devices.

In accordance with another aspect, there is provided an optical device comprising: a first optical grating device having a first spectral response, the first optical grating device being coupleable to a waveguide carrying an optical signal and operable to extract from the optical signal an intermediary signal having an intermediary optical spectrum corresponding to the first spectral response; a second optical grating device having a second spectral response, the second optical grating device being coupled to the first optical grating device to receive the intermediary optical signal and operable to extract, from the intermediary optical signal, an output optical signal having an output optical spectrum corresponding to an overlapping region of the intermediary optical spectrum and the second spectral response of the second optical grating device, at least one of the first and the second spectral responses being tunable to vary the amount of overlapping between the spectral responses of the at least two optical grating devices.

In accordance with another aspect, there is provided a method for tuning an optical signal carried on a waveguide, the waveguide being optically coupled to an optical device for receiving the optical signal, the optical device comprising at least two optical grating devices coupled to one another and having corresponding spectral responses, the method comprising the step of: tuning the spectral response of at least one of said optical grating devices to adjust an amount of overlapping between the spectral responses of the at least two optical grating devices.

In accordance with another aspect, there is disclosed an optical device comprising at least two cascaded Bragg grating optical filters having a bandwidth that can be tuned by offsetting a corresponding Bragg wavelength of one of said cascaded Bragg grating optical filters. By tuning the Bragg wavelengths of said Bragg grating optical filters by corresponding spectral positions, varying and/or moving the bandwidth of the optical device is allowed.

Many further features and combinations thereof concerning the present improvements will appear to those skilled in the art following a reading of the instant disclosure.

DESCRIPTION OF THE FIGURES

In the figures,

FIG. 1 is a schematic diagram of an optical device for tuning an optical signal, in accordance with an embodiment;

FIG. 3A is a schematic representation of a standard International Telecommunications Union (ITU) fixed grid of an optical communication network;

FIG. 3B is a schematic representation of a flexible grid of an optical communication network, in accordance with an embodiment;

FIG. 4 is a schematic view showing an exemplary application of an optical device for tuning an optical signal, in accordance with an embodiment;

Figure 2A:
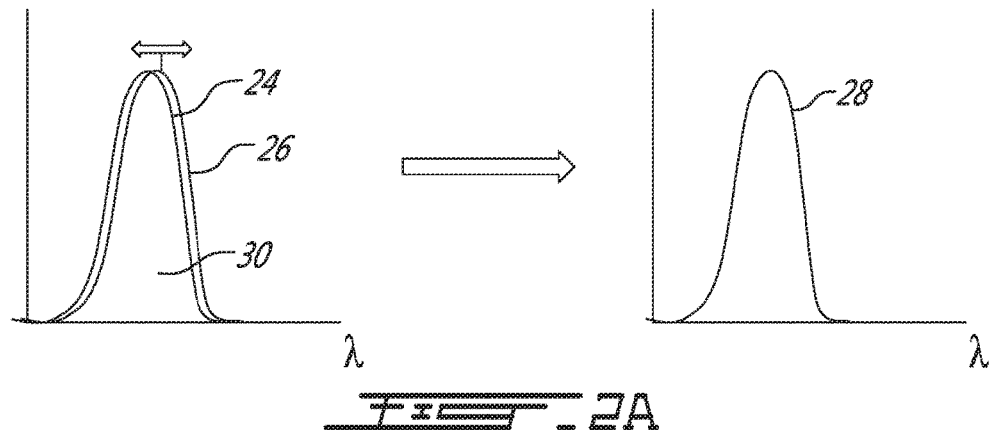
FIG. 2A shows graphs illustrating an amount of overlapping between two spectral responses of associated optical grating devices, in accordance with an embodiment.

These drawings depict example embodiments for illustrative purposes, and variations, alternative configurations, alternative components and modifications may be made to these example embodiments.

DETAILED DESCRIPTION

FIG. 1 broadly depicts an optical device 10 for tuning an optical signal 12, in accordance with an embodiment. As illustrated, the optical device 10 is coupleable to a waveguide 14 to receive the optical signal 12 from which an output optical signal 16 will be extracted by the optical device 10.

The optical device 10 has at least two optical grating devices. The example illustrated has two optical grating devices which will be referred to herein as first and second optical grating devices 18, 20. The first and the second optical grating devices 18, 20 are optically coupled to one another so that the received optical signal 12 can be filtered successively by the first optical grating device 18 and then by the second optical grating device 20. The received optical signal 12 has a generally broad spectrum such as shown at 22, for instance. Also shown in FIG. 1, the first and the second optical grating devices 18, 20 have corresponding first and second spectral responses shown at 24 and 26 such that, after propagation along the first optical grating device 18, the resulting optical signal has an intermediary spectrum 19 and after the propagation along the second optical grating device 20, the output optical signal has an output spectrum 28. As illustrated at 28, the output spectrum 28 corresponds to an amount of overlapping between the spectral responses of the two optical grating devices 18, 20. In this specification; the process of obtaining the output signal from the input optical signal with the optical device 10 will be referred to as extraction for the sake of reference and simplicity. It will be understood that the extraction of the output optical signal from the input optical signal can alternately be referred to as filtration, dropping or other suitable expressions used in the art.

Figure 2B:
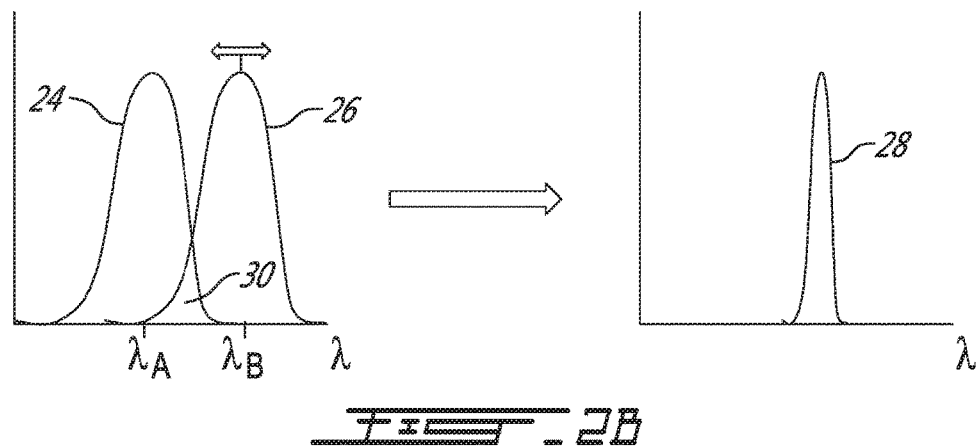
FIG. 2B shows graphs illustrating an amount of overlapping between two spectral responses of associated optical grating devices, in accordance with an embodiment.

FIGS. 2A-B show an example where only one of the optical grating devices has a tunable spectral response. As will be understood by the explanation presented below, this can allow to adjust (e.g., vary, maintain) the bandwidth of the output spectrum. As will be explained with respect to the other example shown in FIG. 2O, alternatives where two optical grating devices are tunable can allow adjusting not only of the bandwidth of the output spectrum but also of a spectral position (i.e. reference wavelength, reference frequency) of the output spectrum for adding versatility to the optical device 10. In other words, the output spectrum can be spectrally translated upon tuning of both the spectral responses 24, 26.

As depicted in FIG. 2A, the second spectrum response 26 is tuned to substantially correspond to the first spectrum response 24 which is fixed (i.e. not tunable) in this embodiment. Accordingly, since the amount of overlapping is similar to either one of the first and the second spectrum responses 24, 26, the output spectrum 28 substantially corresponds to either one of the first or the second spectrum responses 24, 26.

As illustrated in FIG. 2B, the second spectrum response 26 is detuned from the first spectrum response 24. In other words, a central wavelength $\lambda_B$ of the second spectrum response 26 is moved away from a central wavelength $\lambda_A$ of the first spectrum response 24, thus yielding a smaller amount of overlapping 30. Accordingly, since the output spectrum 28 corresponds to the smaller amount of overlapping 30, the output spectrum 28 is spectrally narrower than the first and the second spectrum responses 24, 26.

Figure 2C:
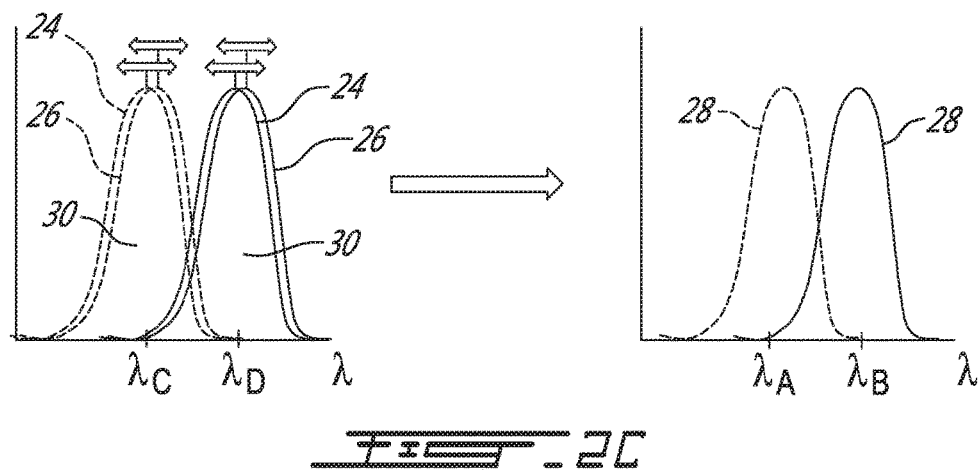
FIG. 2C shows graphs illustrating an amount of overlapping between two spectral responses of associated optical grating devices which is varied from a first spectral position to a second spectral position, in accordance with an embodiment.

As shown in FIG. 2C, the first and the second spectrum responses 24, 26 are both tuned to adjust the spectral position of the collective spectral responses of the optical grating devices 18, 20. In other words, the first and the spectrum responses 24, 26 are both tuned to adjust a first central wavelength $\lambda_C$ of the amount of overlapping 30 to a second central wavelength $\lambda_D$. By doing so, a spectral position of the output spectrum 28 can be adjusted accordingly.

In an embodiment, the spectral responses of two optical gratings can be simultaneously adjusted to vary a central spectral position of the collective spectral responses of the optical grating devices. In another embodiment, the amount of overlapping between the spectral responses of two optical grating devices can be maximized to maximize a rolloff (e.g., a steepness) of the collective spectral response.

FIG. 3A shows a schematic representation of a standard International Telecommunications Union (ITU) fixed grid of a given optical communication network. In this given optical communication network, the channels of the fixed grid have fixed bandwidths $\Delta\lambda f$ due to the fixed filters (not shown) integrated in the given optical communication network. In some circumstances, some channels are used while some other channels are not used which results in empty channels 32, and unused bandwidths. The lack of tunability of these fixed filters render the optical communication network inefficient in appropriately allocating the unused bandwidths of the empty channels 32 to overloaded channels that would require this unused bandwidth to allow a more efficient communication network.

FIG. 3B is a schematic representation of a flexible grid of an optical communication network, in accordance with an embodiment. The optical device 10 described herein can be used in adjusting the bandwidth of a received optical signal. Indeed, the optical device 10 can be conveniently integrated in the optical communication network in order to provide bandwidth tunability, when only one of the optical grating devices is tunable, as well as spectral position tunability, when at least two of the optical grating devices are tunable. In other embodiments, the optical device 10 is embodied in an optical filter, an optical multiplexer, an optical demultiplexer, an optical switch such as a 2-by-1 switch and other optical devices which typically provide bandwidth tunability and, optionally, spectral position tunability.

FIG. 4 is a schematic view showing an exemplary application of the optical device 10 in an optical communication network. In this application, optical devices 10 are used in the flexible demultiplexers (De-Mux) for separating optical channels from one another in accordance with the traffic imparted in the optical communication network at a given time, for instance. Also in this application, optical devices 10 are used in flexible multiplexers (Mux) for further filtering the separated optical channels, for instance, before transmitting the separated optical channels to given clients.

In an embodiment, the optical device 10 is embodied in a photonic die, which is generally manufactured using photonic wafers such as silicon-on-insulator (SOI) wafers, although other types of photonic wafers can also be used such as indium phosphide (InP) or glass wafers. The photonic die can receive the optical device 10 as well as other optical devices for providing photonic-integrated circuits (PICs). In this embodiment, the optical signal propagating in the optical grating devices of the optical device 10 is guided, preferably strongly guided, in PIC waveguides (i.e., the silicon strip in SOI wafers) of the photonic die which enables spectral responses suitable for use with current and next-generation optical communication networks. It is contemplated that the optical device 10 can be manufactured using complementary metal-oxide-semiconductor (CMOS) manufacturing processes which allow the production of an important quantity of optical devices 10 on a single SOI wafer, for instance. Advantageously, the optical device 10 confines the optical signal within the PIC waveguides which avoids the drawbacks associated with free space filters. The photonic device 10 can be made integral to a PIC directly during the manufacturing processes or can alternately be connected and optically coupled to a separate PIC.

As will be illustrated in part by examples provided below, the system can be embodied using different types of optical gratings and different methods of adjusting the central wavelength of the selected optical gratings. The system can be used in different applications, and adapted to such applications via a proper selection of configuration, for instance. Indeed, the following examples show optical grating devices which are embodied in the form of Bragg grating devices which are known to reflect a signal corresponding to its spectral response. In other embodiments, however, other types of optical grating devices, such as strongly-guided transmission grating devices, can be used.

Example 1

Figure 5:
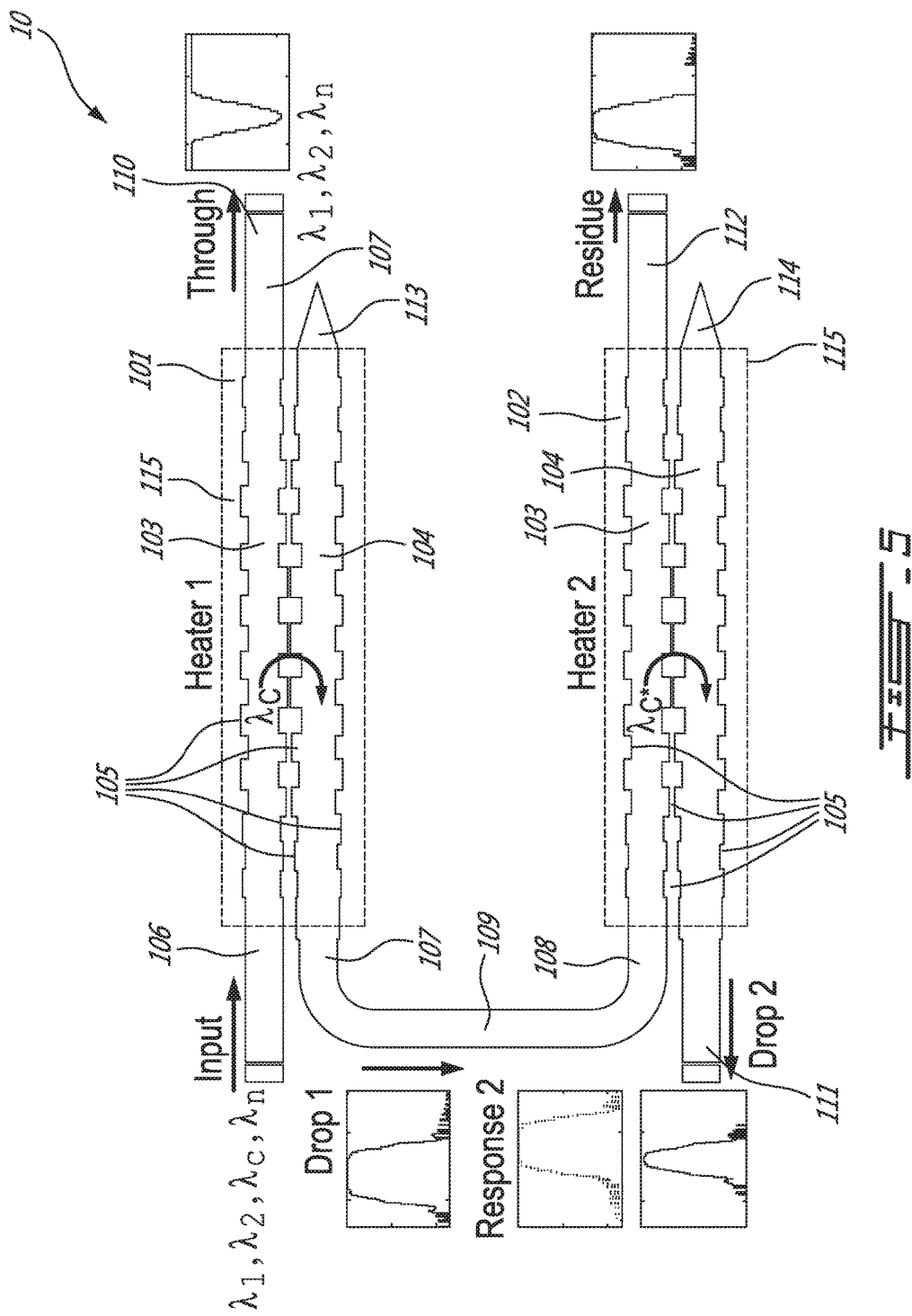
FIG. 5 is a schematic diagram depicting a first example of an optical device for tuning an optical signal, in accordance with an embodiment.

FIG. 5 is a schematic diagram depicting a bandwidth-tunable optical band-pass filter 10 according to an embodiment that is implemented on the SIO wafer. The bandwidth-tunable optical band-pass filter 10 has a pair of cascaded contra-directional couplers (contra-DCs) 101, 102. Each of the contra-DCs comprises two optical grating devices embodied by silicon Bragg waveguides 103, 104 with a small gap between them. In this embodiment, the silicon Bragg waveguides 103, 104 sit on top of a buried oxide (BOX) layer and are cladded by a cladding layer made of silicon dioxide ($SiO_2$). Bragg grating walls 105 are formed by corrugating sidewalls of the silicon waveguides (broadly referred to as PIC waveguides) 103 and 104. With the assistance of the Bragg grating walls 105, each of the couplers (101 and 102) performs as an add-drop filter with a spectral pass-band centered at a certain wavelength. The input port 106 of the first contra-DC is used as the input port of the bandwidth-tunable optical band-pass filter 10. The first contra-DC's drop port 107 is connected to the second contra-DC's input port 108 though a waveguide 109. The first contra-DC's through port 110 is used as the through port of the bandwidth-tunable optical band-pass filter 10. The output optical signal is outputted at the second contra-DC's drop port 111. Wavelengths dropped by the first contra-DC but not dropped by the second contra-DC are outputted from the second contra-DC's through port as residual light. The add ports of the two contra-DCs 113 and 114 are tapered down to the minimum feature size allowed in fabrication to suppress possible optical feedback. In this embodiment, the spectral responses of the first and the second Bragg grating devices 103, 104 are tuned by corresponding heaters 115 in order to expand/contract the Bragg grating devices 103, 104 which typically adjust their corresponding Bragg wavelengths for tuning purposes, for instance. An exemplary coefficient of spectral position variation can be 0.08 nm per degree Kelvin so that the spectral frequency be shifted by about 10 nm by heating the heaters 115 by about 125 degrees Kelvin, for instance. In an embodiment, the bandwidth of the resulting optical device 10 can be more than 800 GHz, and more preferably more than 1 THz while the spectral position can be tuned from 117 GHz to 800 GHz, and more preferably from 10 GHz to 1 THz, for instance.

Figure 6:
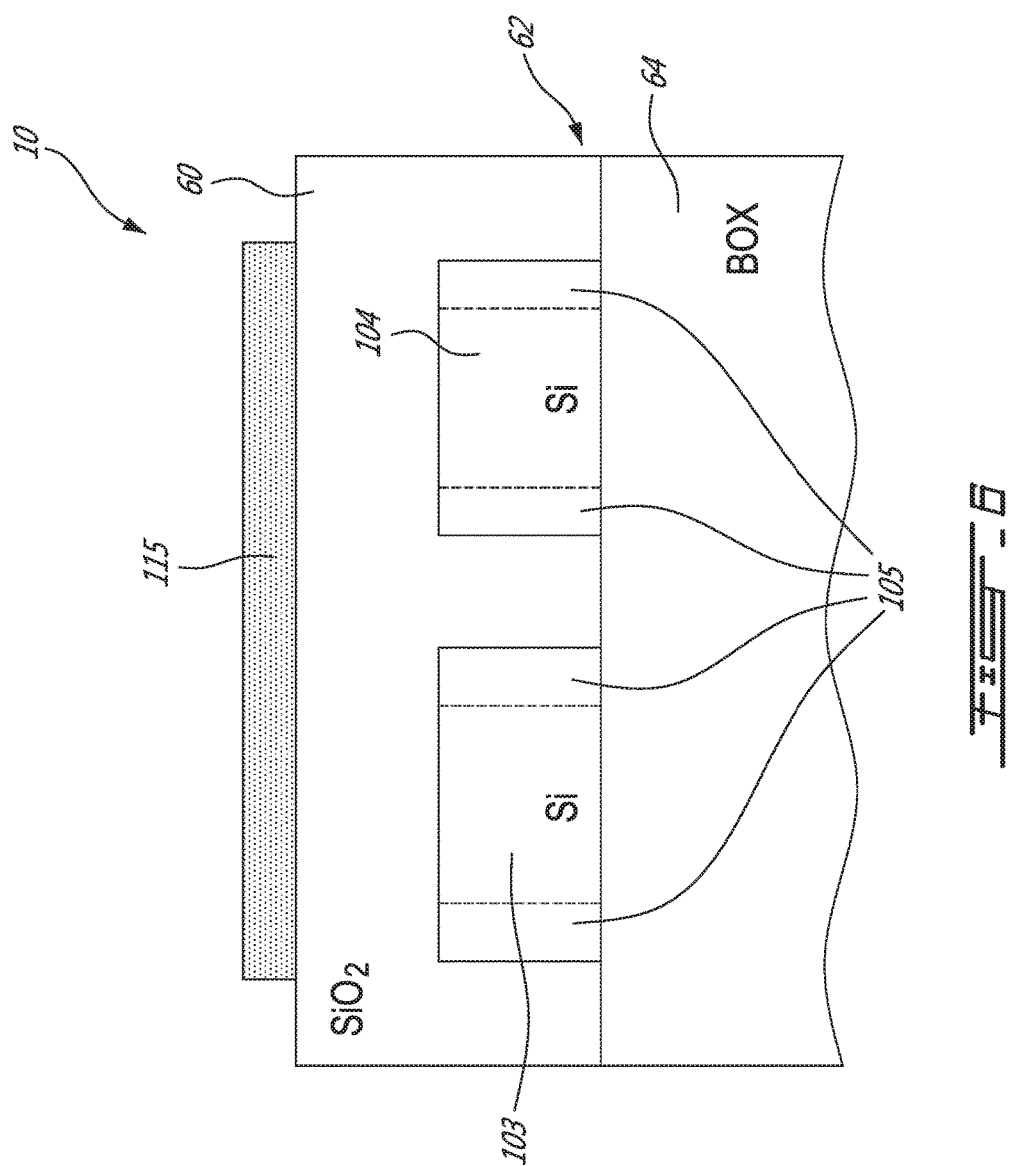
FIG. 6 is a transversal cross-sectional view of an optical grating device of an optical device for tuning an optical signal, in accordance with an embodiment.

FIG. 6 shows a transversal cross-sectional view of the Bragg grating devices 103, 104. In this specific embodiment, the Bragg grating devices 103, 104 are tuned by operation of the heater 115 which is disposed over the cladding layer 60 of the photonic wafer 62. In another embodiment, the BOX layer 64 can be recessed under the Bragg grating devices 103, 104 entirely or partially, such as being sandwiched between the Bragg grating devices and a silicon wafer or other substrate, to provide thermal insulation of the Bragg grating devices 103, 104, which can, in turn, reduce the power requirements of the optical device 10. In still other embodiments, the silicon wafer, or other substrate, underneath the BOX layer can be omitted.

The center wavelength of the contra-DC is determined by the phase-match condition: $\lambda_C = \Lambda(n_1+n_2)$, where $\lambda_C$ is the center wavelength (i.e. the Bragg wavelength) of contra-directional coupling, $\Lambda$ is the grating pitch, and $n_1$ and $n_2$ are the effective indices of the first-order and second-order eigenmodes in the coupler. Changing the current through the micro-heaters 115 can change the temperature of the silicon waveguides underneath the micro-heaters and thus the center-wavelengths of the contra-DCs. Output signal from the drop port 111 is determined by the product of the transfer functions of the two contra-DCs, Only the wavelengths within the pass-bands of both contra-DCs are selected as output of the drop port 111. The bandwidth is at maximum when the center-wavelengths of the cascaded contra-DCs are aligned and can be reduced by offsetting the center wavelengths of the cascaded contra-DCs. As mentioned above, the bandwidth tunability is achieved by detuning at least one of the two contra-DCs. At a fixed bandwidth, center wavelength tuning of the output spectrum of the drop port 111 is achieved by tuning the contra-DCs in a similar manner.

FIGS. 7A-C show experimental results associated with the optical device 10 as shown in FIG. 5. The optical device 10 was fabricated using a CMOS-compatible technology with electron-beam lithography, for instance. Fiber grating couplers were used as optical input/outputs (IOs) in the measurement. FIG. 7A shows the measured drop port response of the cascaded contra-DC filters. The measurements were normalized using the response of a pair of directly connected fiber grating couplers on the same chip. In this embodiment, the optical device 10 exhibits a high side-lobe suppression ratio (SLSR) over 40 dB and a contrast of about 55 dB between the pass-band and the noise floor. The experiment showed that the insertion loss is less than 0.5 dB, with acceptable ripples of less than 0.3 dB within the 1-dB pass-band over 5.8 nm (733 GHz). The edge roll-off rate s 19 dB/nm on the left side and 24 dB/nm on the right side, for instance.

As shown in FIG. 7B, the temperature was increased on one of the contra-DCs, while keeping the temperature on the other constant, thus misaligning the center wavelengths of the two contra-DCs, resulting in a smaller amount of overlapping between the two contra-DCs and thus a narrower pass-band in the drop port 111. Due to this wavelength detuning, the stop-band edges are only determined by one of the first and the second spectral responses 24, 26. As a result, the side-lobes suppression degrades for small bandwidths but can be over 15 dB. A continuous tuning of the 3-dB bandwidth from 788 GHz down to 117 GHz (i.e., over 670 GHz or 5.4 nm) was experimentally observed as the on-chip temperature was increased by 70 degrees. The smallest bandwidth measured in this case was limited by the maximum power delivered in the experiment. A smaller bandwidth below 50 GHz should be feasible if more robust heaters are used.

By applying the same temperature variation on both contra-DCs, the center wavelength can be tuned without affecting the filter shape. As shown in FIG. 7C, when the center wavelength is continually changed over 4 nm by varying the on-chip temperature, the filter shape is maintained with sharp edges. Actually, slight detuning between the cascaded contra-DCs may be used to compensate for band-edge distortions due to fabrication errors for a more symmetric filter shape.

Figure 8:
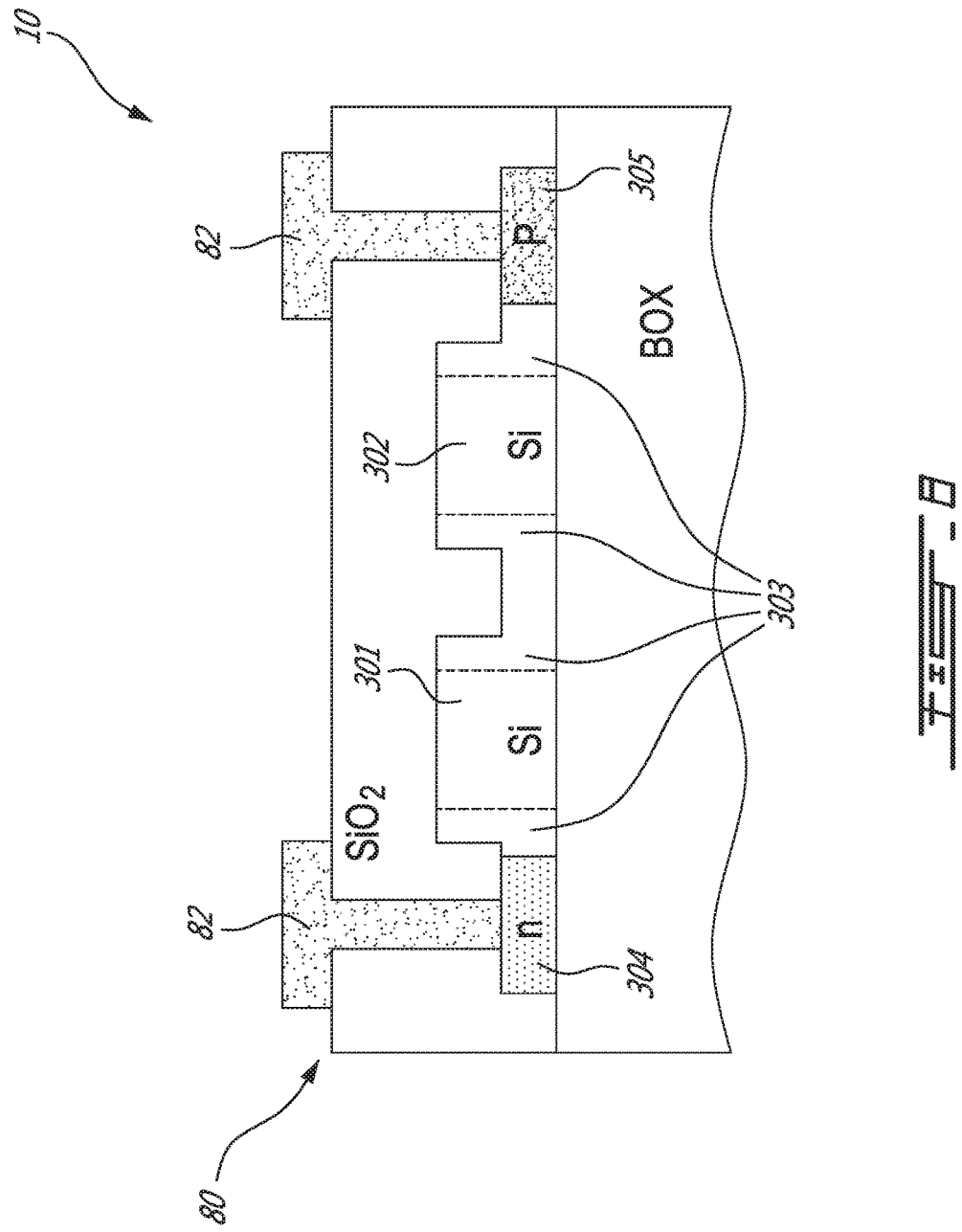
FIG. 8 is a transversal cross-sectional view of an optical grating device of an optical device for tuning an optical signal, in accordance with an embodiment.

Tuning of the spectral responses 24 and 26 of the optical grating devices 18, 20 is not limited to the use of the heaters 115, but can encompass other suitable tuning mechanisms. Indeed, FIG. 8 show transversal cross-sectional view of an optical device 10 which includes another type of tuning mechanism. As depicted, the two optical grating devices are embodied in an electrical junction 80 such as a p-i-n junction which can allow to adjust the spectral responses 24, 26 by varying an electrical current provided to electrodes 82 of the electrical junction 80. This tuning mechanism can allow to achieve a tunability speed which is higher than the heaters 115 described above. For instance, as shown in FIG. 8, the two silicon waveguides 301 and 302 in the contra-DC have a rib waveguide structure. The Bragg grating walls 303 are formed on sidewalls and in waveguide slabs 304, 305 between the two waveguides. The waveguide slabs beside the coupler are doped, one side in N type 304 and the other side in P type 305. Free carriers (i.e., electrons and holes) can be injected into the two waveguides by forward biasing the p-i-n junction, for instance. The refractive indices of silicon waveguides are functions of free-carrier concentrations so that by varying the current in the p-i-n junction, effective indices of the Bragg grating devices can be varied accordingly, thus varying the spectral response of the Bragg grating device.

Example 2

Figure 9:
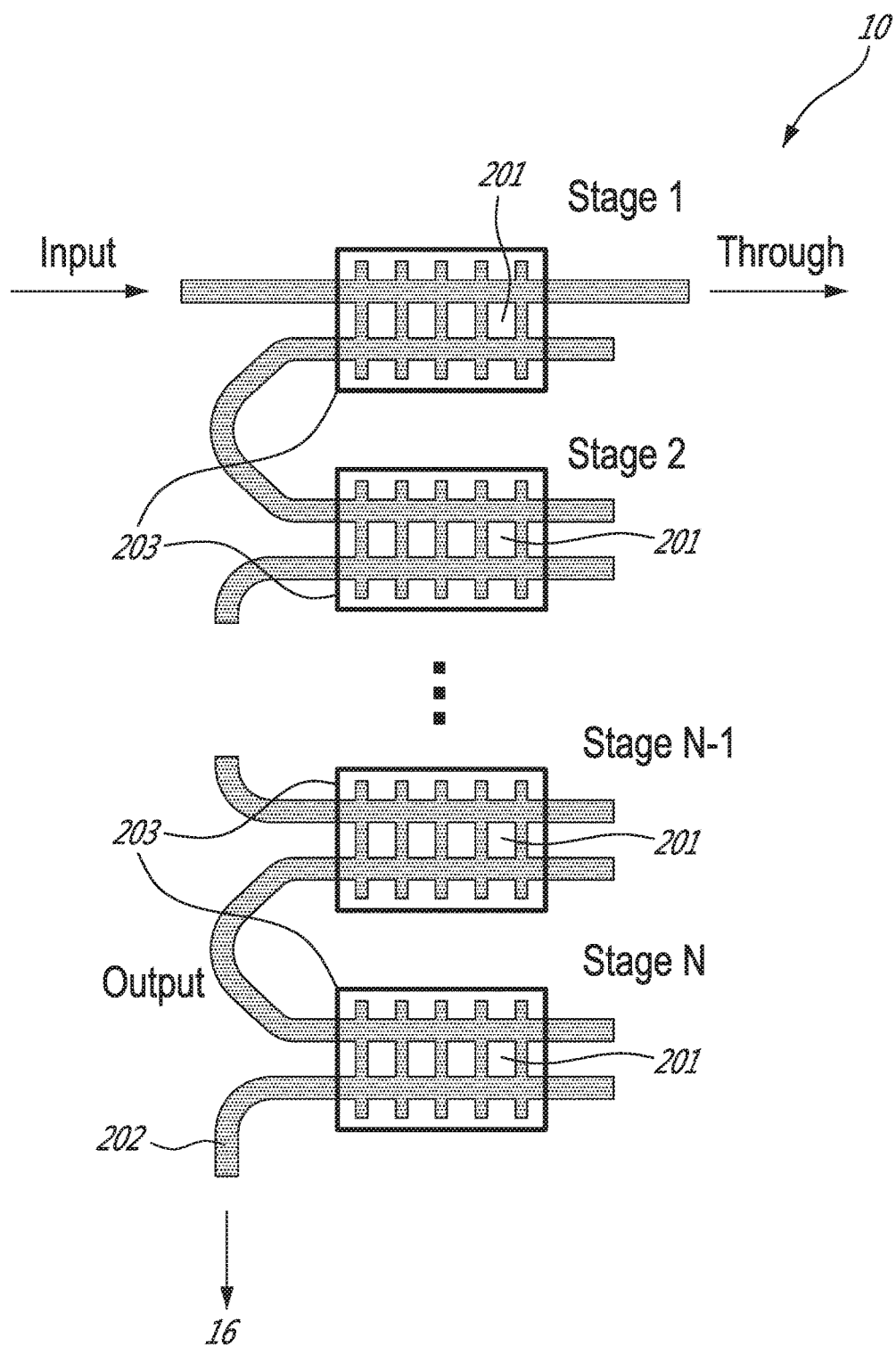
FIG. 9 is a schematic diagram of a second example of an optical device for tuning an optical signal, in accordance with an embodiment.

The optical device 10 can include a plurality of optical grating devices to achieve an output spectrum having sharper roll-offs and sharper edges, for instance. FIG. 9 is a schematic view of a multi-stage bandwidth-tunable band-pass filter 10 according to an embodiment. It includes a number (N) of contra-DCs 201. The drop port of the $(n-1)^{th}$ contra-DC is connected to the input port of the $n^{th}$ contra-DC, where n represents an integer from 1 to the total stage number N. The drop-port of the $N^{th}$ contra-DC 202 gives the output optical signal 16 of the multi-stage filter 10. The center-wavelength of each contra-DC can be independently tuned using tuning mechanisms 203, which can each be similar to one another or different, depending on the circumstances. The output optical signal 16 of the multistage filter 10 is dependent on detuning between the contra-DCs.

Example 3

Figure 10:
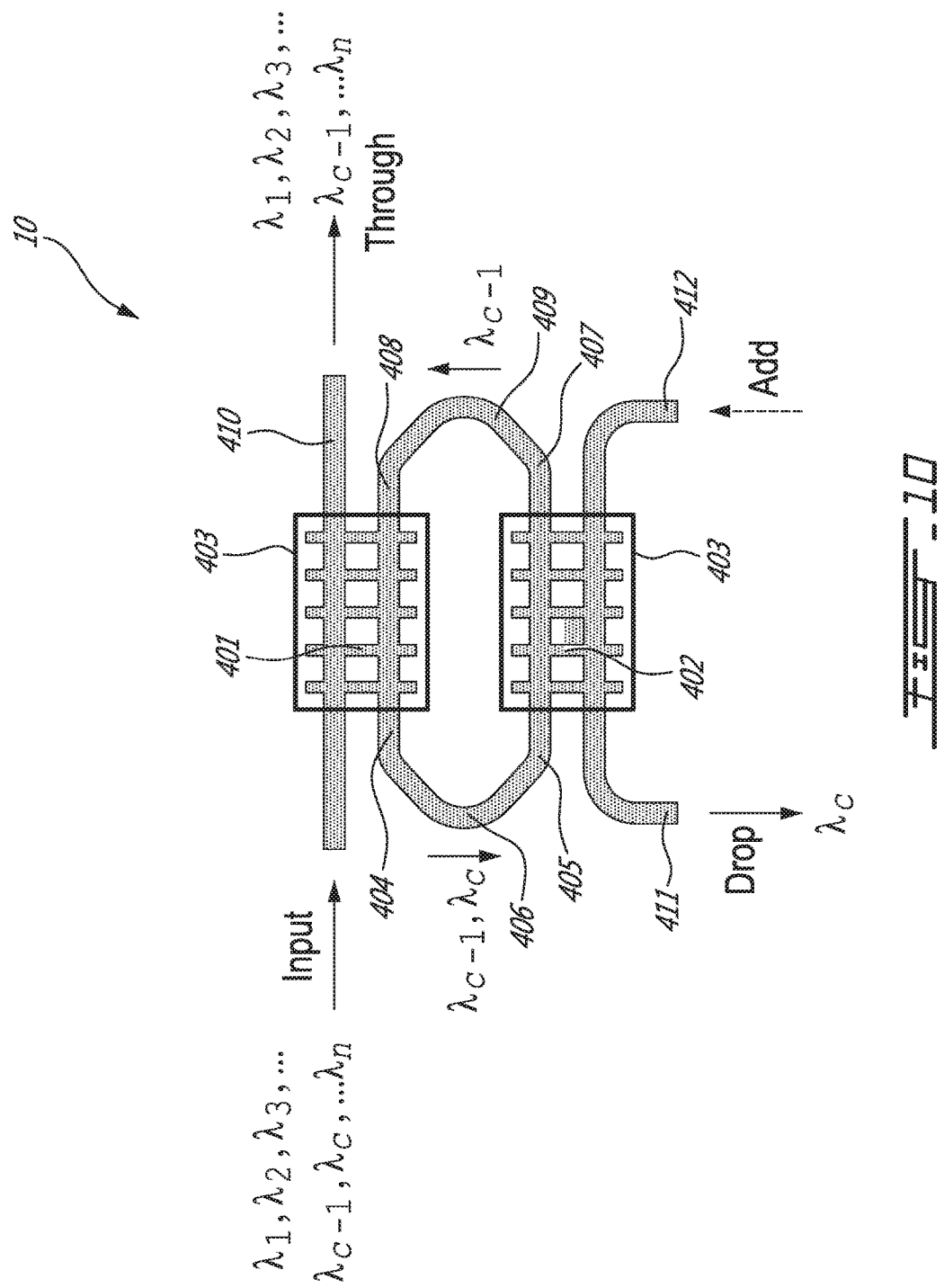
FIG. 10 is a schematic diagram of a third example of an optical device for tuning an optical signal, in accordance with an embodiment.

In the embodiments described above, only the drop-port's bandwidth can be tuned. The through-port response is determined only by the first-stage contra-DC. Those wavelengths that are dropped by the first contra-DC but not dropped by the high-order contra-DCs cannot be used in the optical communication system. FIG. 10 is a schematic view of the optical device 10 concerning this challenge. Indeed, the optical device 10 comprises two contra-DCs 401 and 402 that are independently tuned by a tuning mechanism 403. The drop port of the first contra-DC 404 is connected to the input port of the second contra-DC 405 through a waveguide 406. The through port of the second contra-DC 407 is connected to the add port of the first contra-DC 408 through a waveguide 409. To illustrate the operation principle of this embodiment, a group of wavelengths ($\lambda_1$, $\lambda_2$, $\lambda_3$, ... $\lambda_{c-1}$, $\lambda_c$, ... $\lambda_n$) are inputted in the optical device 10. The two contra-DCs are initially set to be centered at a wavelength $\lambda_c$. Assuming the pass-band of the contra-DCs encompasses the wavelengths $\lambda_{c-1}$ and $\lambda_c$, both these wavelengths are selected by the first contra-DC 401 and sent to the second contra-DC. If only $\lambda_c$ is needed in the output, the center wavelengths of the two contra-DCs can be detuned so that after passing through the second contra-DC 402, $\lambda_{c-1}$ is coupled back to the through port 410. This embodiment can allow for simultaneous bandwidth tuning of the drop-port 411 and the through-port 410. In addition, a signal at A, can be added from the add port 412 to the through port 410. The bandwidth of the add-port is tuned simultaneously with the through and drop ports. Therefore, this embodiment is functionally a bandwidth-tunable add-drop filter. A multi-stage design using this bandwidth-tunable add-drop filter can also be implemented in a configuration similar to the embodiment illustrated in FIG. 9.

Example 4

Figure 7:
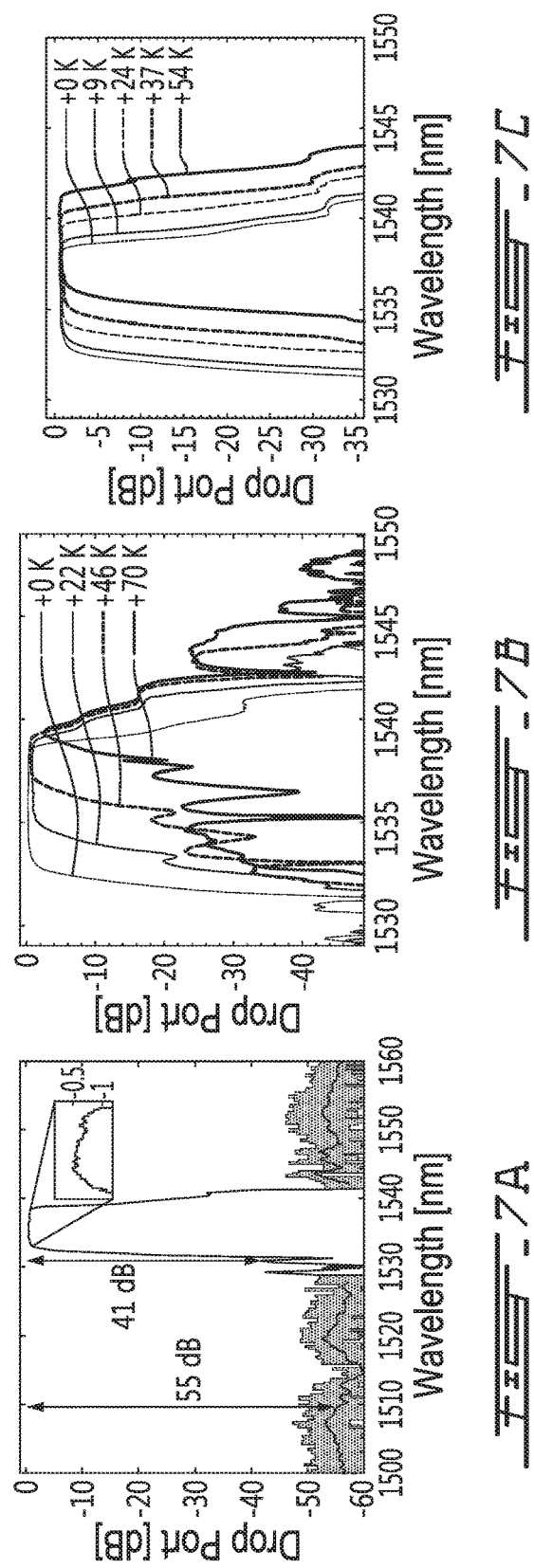
FIG. 7A is a spectrum diagram depicting an output optical spectrum of an optical device for tuning an optical signal, in accordance with an embodiment.
FIG. 7B is a spectrum diagram depicting output optical spectra each associated with an optical device for tuning an optical signal having a different amount of overlapping between spectral responses of first and second optical grating devices, in accordance with an embodiment.
FIG. 7C is a spectrum diagram depicting output optical spectra each associated with an optical device for tuning an optical signal having a same amount of overlapping between spectral responses of first and second optical gratings for different spectral position of the collective spectral responses of first and second optical grating devices, in accordance with an embodiment.
Figure 11:
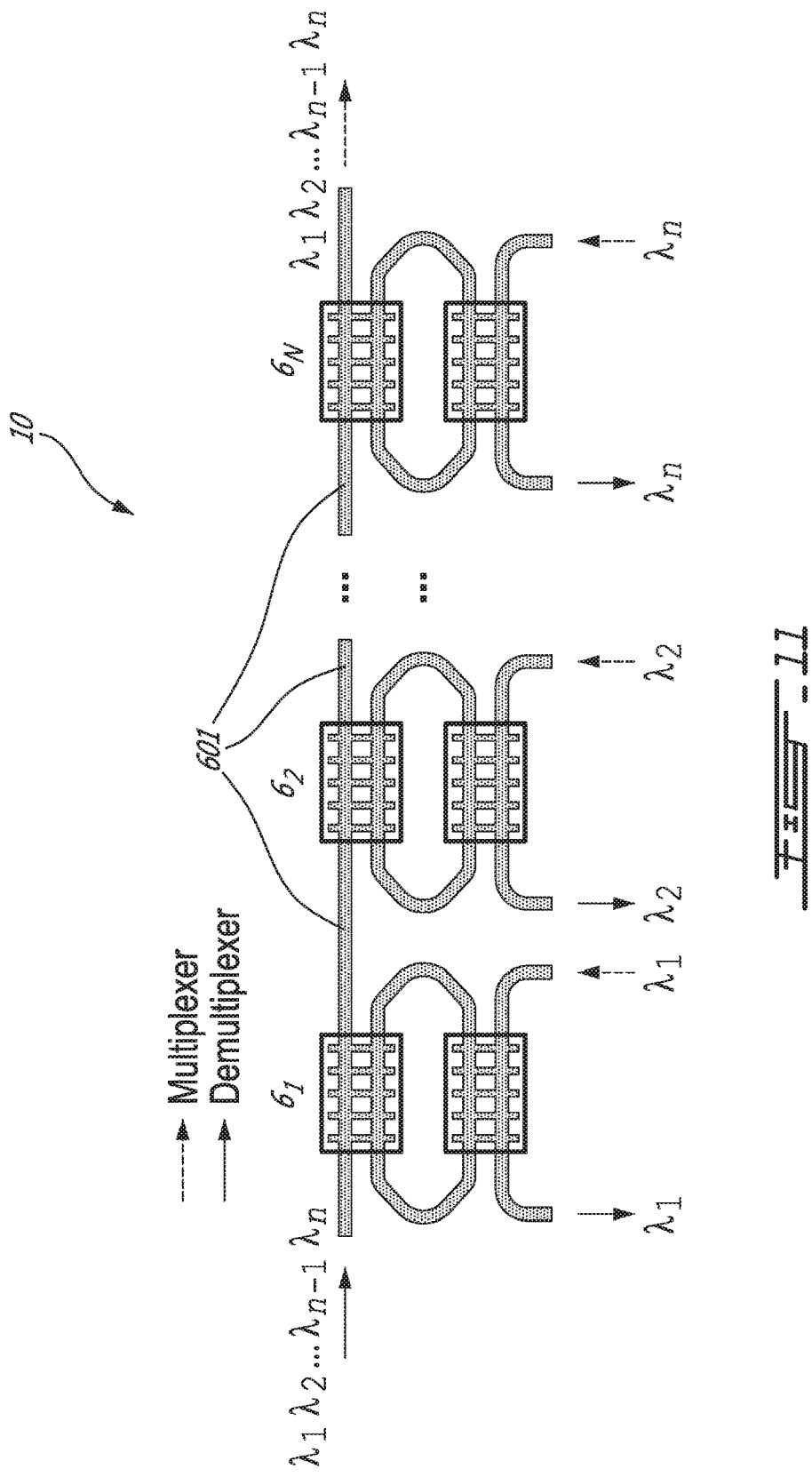
FIG. 11 is a schematic diagram of a fourth example of an optical device for tuning an optical signal, in accordance with an embodiment.

FIG. 11 is a schematic diagram depicting an apparatus for a flexible wavelength multiplexer/demultiplexer 600 according to an embodiment of the disclosure. As shown in FIG. 7, the wavelength multiplexer/demultiplexer 600 comprises a plurality of bandwidth-tunable add-drop optical filters $6_1$-$6_n$ that are connected to a single bus waveguide 601. The bandwidth-tunable add-drop optical filters $6_1$-$6_n$ can be implemented in accordance with embodiments 400 and 500. Each of bandwidth-tunable add-drop optical filters corresponds to a wavelength channel in a WDM network, whose center wavelength and bandwidth can be dynamically tuned.

Example 5

Figure 12:
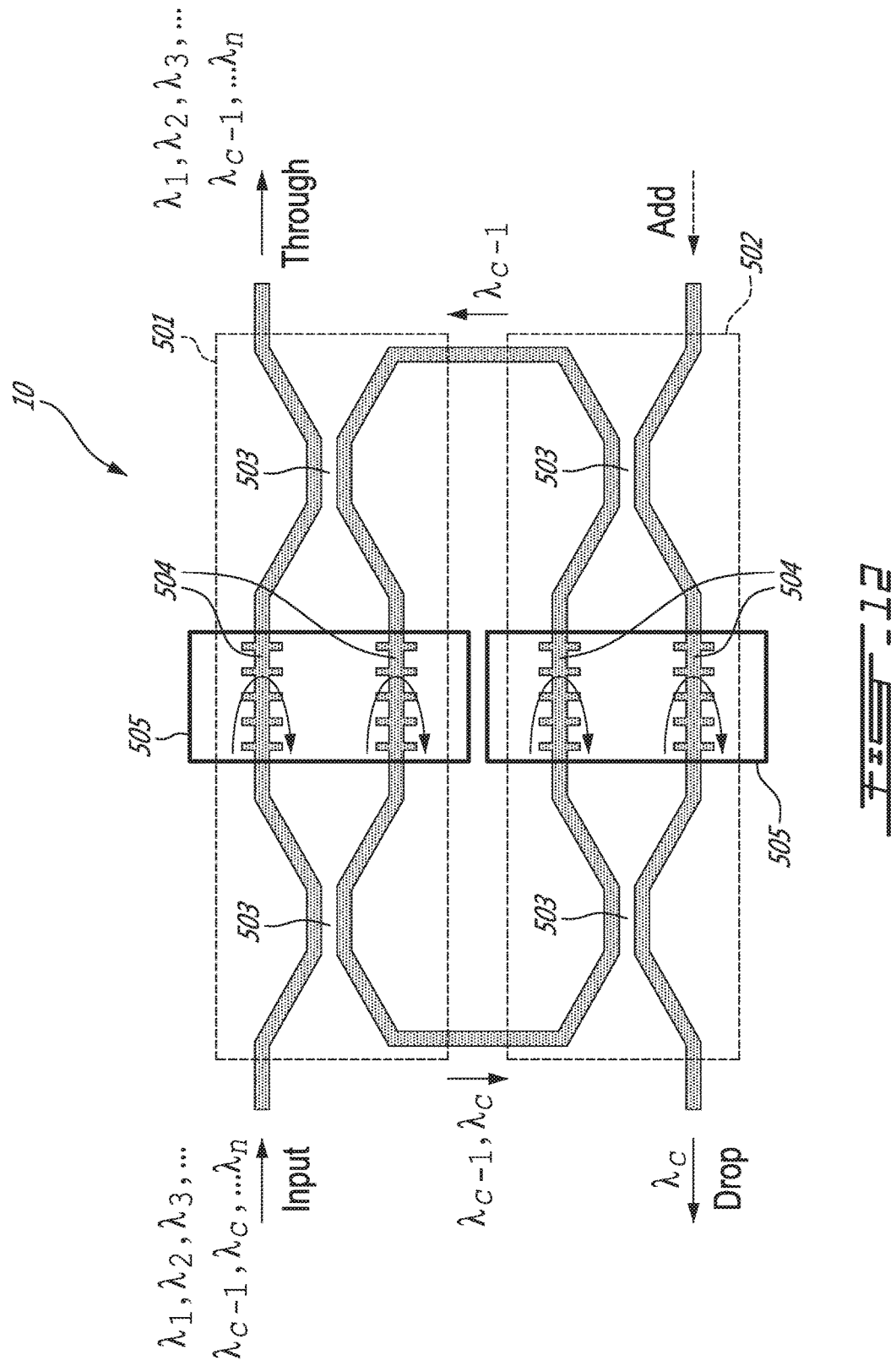
FIG. 12 is a schematic diagram of a fifth example of an optical device for tuning an tuning an optical signal, in accordance with an embodiment.

In the above described embodiments, wavelength-tunable contra-DCs have been used as Bragg wavelength selective elements in the proposed cascade configuration. Other types of Bragg-grating add-drop filters, such as Bragg-grating assisted Mach-Zehnder interferometers (MZIs), can also be used in this cascade configuration. A bandwidth-tunable add-drop filter according to an embodiment is illustrated in FIG. 12. It includes two Bragg-grating assisted MZIs 501 and 502. Each Bragg-grating assisted MZI includes two 3-dB couplers 503 and two identical Bragg gratings 504 on the two arms of the MZI. While simple directional couplers are used here, other 3-dB splitter/combiner structures, such as multiple-mode interference (MMI) couplers and adiabatic 3-dB couplers, can also be used. The two Bragg gratings are tuned simultaneously using a tuning mechanism 505. The operation principle is same as the previous embodiment illustrated in FIG. 5.

Example 6

The current structure is currently applicable to long spectrum mode, e.g., 100 GHz bandwidth. Some applications can require 50 GHz or even MHz range bandwidth. It is currently very difficult to achieve such bandwidths without phase shifted Bragg grating(s). The need for such applications was felt in particular in terms of adapting to existing DWDM structures.

Figure 13:
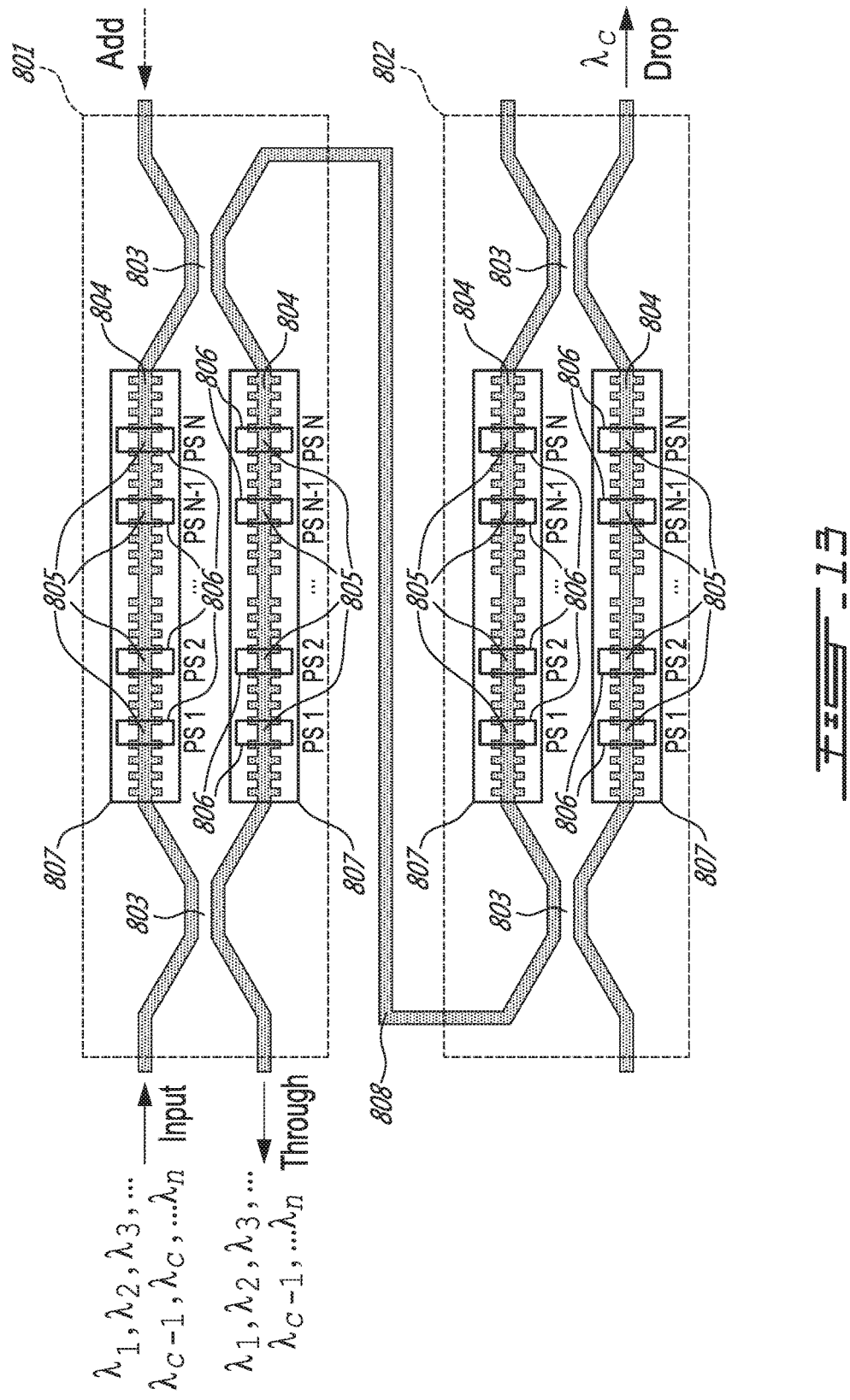
FIG. 13 is a schematic diagram of a sixth example of an optical device for tuning an optical signal, in accordance with an embodiment.

Indeed, phase-shifted Bragg-gratings add-drop filters can also be used in the disclosed cascade configuration to adjust the bandwidth and center frequency. These filters have one or more phase shift sections to create resonant peaks within the stop band of Bragg gratings for narrower filter bandwidths or engineered filter shapes. An example corresponding to an embodiment is shown in FIG. 13. It can have two phase-shifted Bragg-grating assisted interferometers 801 and 802, each performing as a wavelength selective element. Each phase-shifted Bragg-grating assisted interferometer includes two 3 dB couplers 803 and two phase-shifted Bragg gratings 804 on the two arms of the interferometer. While simple directional couplers are used here, other 3-dB splitter/combiner structures, such as multiple-mode interference (MMI) couplers and adiabatic 3-dB couplers, can also be used. The phase-shifted Bragg gratings have one or multiple phase shifts 805. The center frequency of each phase-shift can be tuned individually by a tuning mechanism 806, such as thermal tuning analogous to the example shown in FIG. 6 or carrier injection analogous to the example shown in 8, in order to adjust the phase and magnitude responses of the phase-shifted Bragg gratings. The phase-shifted Bragg-grating assisted interferometers 801 and 802 are connected by a waveguide 808 for the second phase-shifted Bragg-grating assisted interferometer 802 to receive the signal output from the first phase-shifted Bragg-grating assisted interferometer 801. The center frequency of the phase-shift Bragg gratings can also be adjusted simultaneously by a tuning mechanism 807, such as thermal tuning analogous to the example shown in FIG. 6 or carrier injection analogous to the example shown in FIG. 8, in order to adjust the frequency positions and the spectrum overlapping of the interferometers 801 and 802. Depending on the application, the heating and/or the size of the device can vary.

As can be understood, the examples described above and illustrated are intended to be exemplary only. For instance, the optical grating device can be a diffraction grating device, Additionally, or alternately, the optical grating device can be a reflective grating device. In these embodiments, the optical grating device can be a Bragg grating device. The scope is indicated by the appended claims.

What is claimed is:

1. An optical device coupleable to a waveguide to receive an optical signal from the waveguide, the optical device comprising at least two optical grating devices optically coupled to one another and having corresponding spectral responses, the spectral response of at least one of said optical grating devices being tunable to adjust an amount of overlapping between the spectral responses of the at least two optical grating devices.

2. The optical device of claim 1, wherein the optical signal is guided by the at least two optical grating devices to provide an output optical signal having an output spectrum tuned by the at least one of said optical grating devices and the two optical grating devices are coupled to one another via a coupling waveguide.

3. The optical device of claim 1, wherein the spectral response of two of said optical grating devices are tunable to further adjust the spectral position of the collective spectral responses of the optical grating devices.

4. The optical device of claim 1, wherein the at least two optical grating devices are contra-directional couplers cascaded from one another.

5. The optical device of claim 1, wherein the waveguide is a PIC waveguide of a photonic die and the optical grating devices are coupled to the PIC waveguide.

6. The optical device of claim 5, wherein the photonic die is a silicon-on-insulator (SOI) wafer.

7. The optical device of claim 1, wherein at least one of the optical grating devices is a reflective grating device.

8. The optical device of claim 1, wherein at least one of the optical grating devices is a Bragg grating device.

9. The optical device of claim 8, wherein the Bragg-grating device is a phase-shifted Bragg-grating device.

10. An optical device comprising:
a first optical grating device having a first spectral response, the first optical grating device being coupleable to a waveguide carrying an optical signal and operable to extract from the optical signal an intermediary signal having an intermediary optical spectrum corresponding to the first spectral response;
a second optical grating device having a second spectral response, the second optical grating device being coupled to the first optical grating device to receive the intermediary optical signal and operable to extract, from the intermediary optical signal, an output optical signal having an output optical spectrum corresponding to an overlapping region of the intermediary optical spectrum and the second spectral response of the second optical grating device, at least one of the first and the second spectral responses being tunable to adjust the amount of overlapping between the spectral responses of the at least two optical grating devices.

11. The optical device of claim 10, wherein the optical signal is guided by the first and the second optical grating devices to provide an output optical signal having an output spectrum tuned by the at least one of said optical grating devices.

12. The optical device of claim 10, wherein the first and the second spectral responses are tunable to further adjust the spectral position of the collective spectral responses of the first and the second optical grating devices.

13. The optical device of claim 10, wherein the first and the second optical grating devices are contra-directional couplers cascaded from one another.

14. The optical device of claim 10, wherein the waveguide is a PIC waveguide of a photonic die and the first and the second optical grating devices are coupled to the PIC waveguide.

15. The optical device of claim 14, wherein the photonic die is a silicon-on-insulator (SOI) wafer.

16. The optical device of claim 10, wherein at least one of the optical grating devices is a Bragg grating device.

17. The optical device of claim 16, wherein the Bragg-grating device is a phase-shifted Bragg-grating device.

18. A method for tuning an optical signal carried on a waveguide, the waveguide being optically coupled to an optical device for receiving the optical signal, the optical device comprising at least two optical grating devices coupled to one another and having corresponding spectral responses, the method comprising the step of:

tuning the spectral response of at least one of said optical grating devices to adjust an amount of overlapping between the spectral responses of the at least two optical grating devices.

19. The method of claim 18, wherein said tuning includes simultaneously adjusting the spectral responses of two of said optical grating devices to adjust a central spectral position of the collective spectral responses of the optical grating devices.

20. The method of claim 18, wherein said tuning includes maximizing the amount of overlapping between the spectral responses of the at least two optical grating devices to maximize a rolloff of the collective spectral response.

* * * * *